Nov. 25, 1952  J. S. BELL  2,619,054
LIQUID FERTILIZER PLOW
Filed March 15, 1949  2 SHEETS—SHEET 2
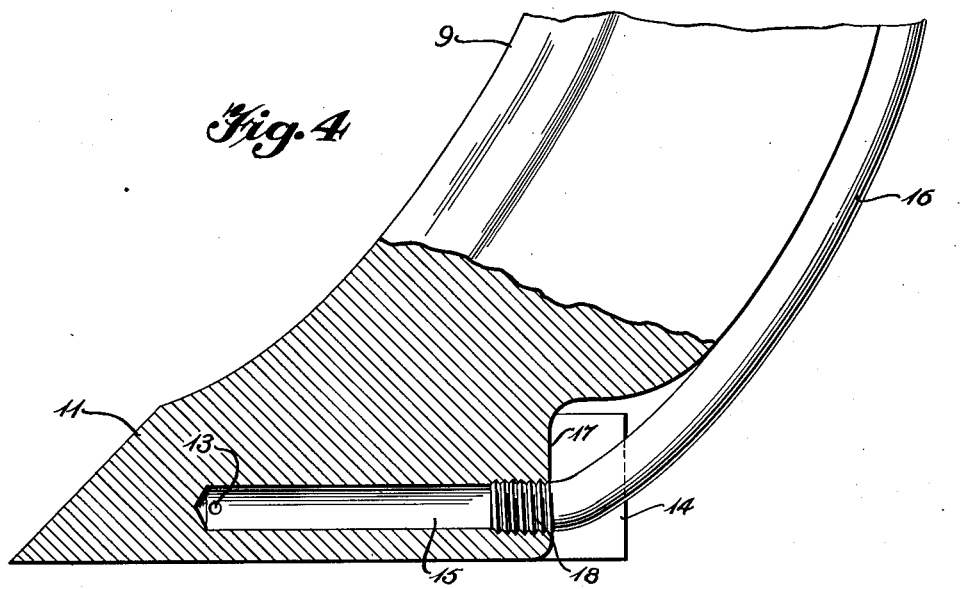
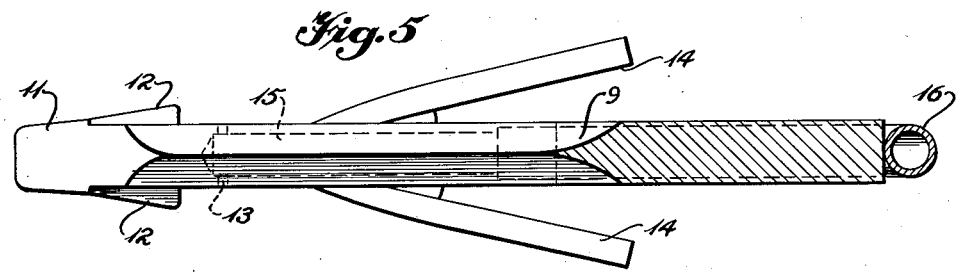
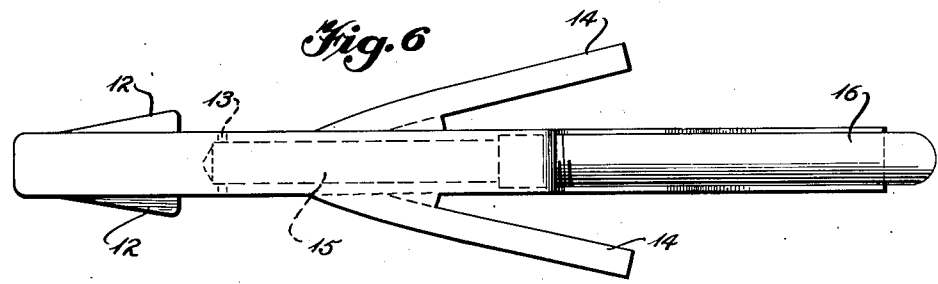
Inventor
James S. Bell
By Cushman, Darby & Cushman
ATTORNEYS Patented Nov. 25, 1952

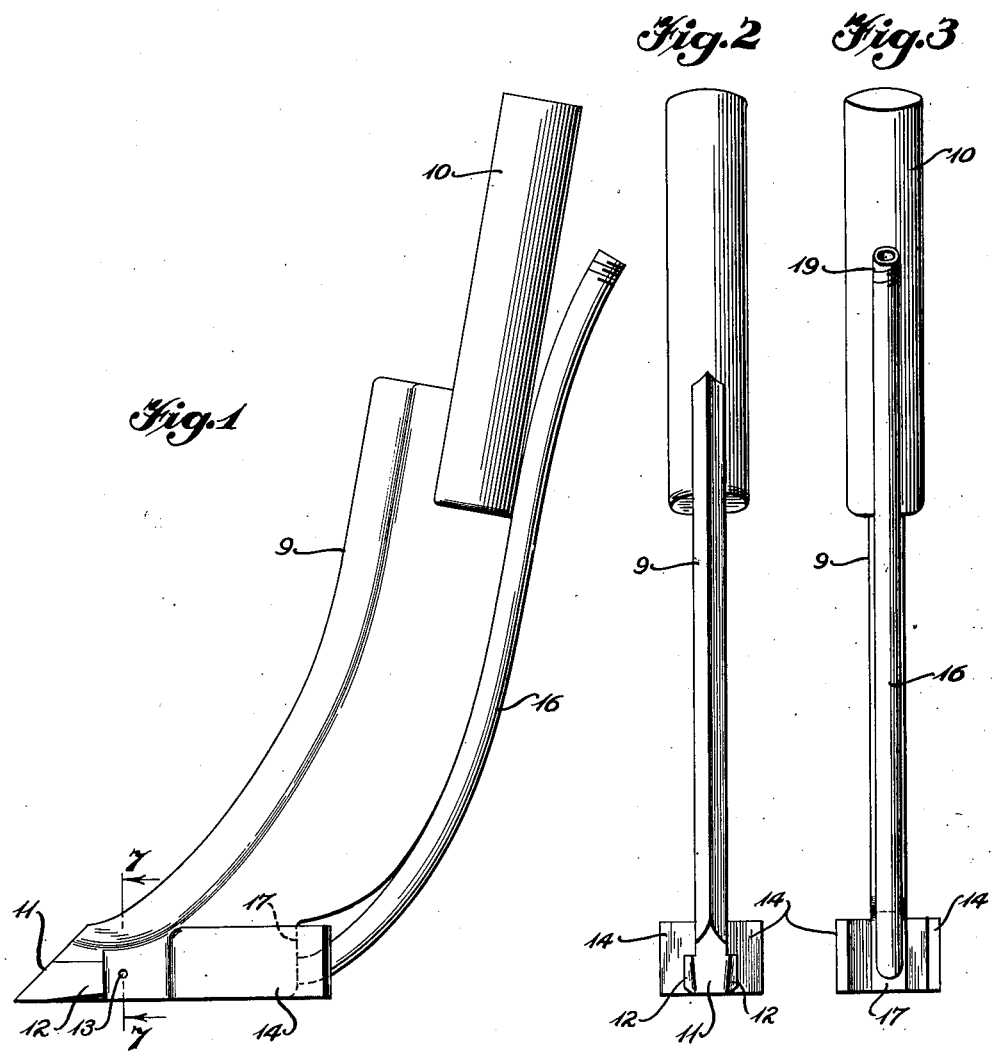
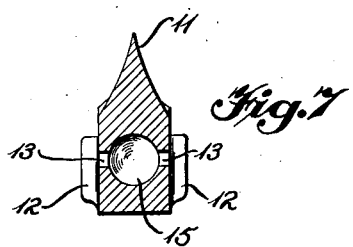

2,619,054

UNITED STATES PATENT OFFICE 2,619,054

LIQUID FERTILIZER PLOW

James S. Bell, Inverness, Miss.

Application March 15, 1949, Serial No. 81,475

4 Claims. (Cl. 111—7)

This invention relates to earthworking implements and has for its object to provide a plowshare which will deliver a fluid fertilizer to the side walls of the furrow and seal those side walls to ensure retention of the fertilizer in the earth and prevent its dissipation from the areas in which it has been deposited.

With some types of fertilizers, such, for example, as anhydrous ammonia, which has a high nitrogenous content, the molecular particles of the fluid combine with the molecules of moisture in the ground. Anhydrous ammonia is highly volatile and unless the impregnated earth is immediately packed and sealed, following introduction of the fluid, the fluid fertilizer and moisture elements become separated and the ammonia content dissipated, so that the fertilizing effect is lost.

To overcome this difficulty, the implement of this invention is provided not only with means for impregnating the walls of the furrows with fluid fertilizer, here shown as the side walls of the furrow, with the fertilizing fluid, but also with following instrumentalities which will pack the earth over the impregnated areas and seal them against the escape of fluid.

In the drawings herewith is shown one embodiment of the invention, and in said drawings:

Figure 1 is a view in side elevation of the element.

Figure 2 is a view in front elevation.

Figure 3 is a view in rear elevation.

Figure 4 is a sectional view of the point of the element.

Figure 5 is a top plan view of the point.

Figure 6 is a bottom plan view of the point.

Figure 7 is a sectional view on substantially the line 7—7 of Figure 1 looking in the direction of the arrows.

In the description which follows the elements of the structure shown will be designated by numerals, like parts being indicated by the same numbers in the several views. The implement or plowshare in its general make-up may be of any usual or desired construction, capable of turning a furrow. The body portion 9 is furnished with any suitable shank 10 for attachment to the plow frame. The body 9 has the penetrating and earth turning point 11 provided on each side with flanges 12 which form an abrupt shoulder just in front of lateral fluid distributing apertures 13, two being shown, one on each side of the points, in the walls of the point 11. These shouldered anti-clogging flanges direct the earth away from the apertures and eliminate danger of filling them with earth and closing them. In rear of apertures 13 the point 11 is provided with blades 14 inclined outwardly from front to rear in a V-formation and having an overall width greater than that of the furrow making point 11. These blades 14 will engage the side walls of the furrow so as to pack the earth and seal in and prevent the escape of the fluid fertilizer which has been injected into the walls of the furrow through the apertures 13.

To supply the fertilizer to apertures 13 the point 11 is provided with a chamber 15 preferably disposed lengthwise of the point for economy of space and a capacity to give a local supply sufficient to keep the apertures 13 supplied with fluid. Chamber 15 is fed by a pipe 16 secured to the rear of the share 10 and conforming to the contour of the rear edge of the share in any suitable manner, as by brazing or soldering. The pipe 16 is of a diameter not greater than the cross-sectional area of the share, so that the pipe will not be disturbed by contact with the sides of the furrow as the share travels through the ground. At its lower end pipe 16 engages a substantially vertical shoulder or offset 17 on the rear of point 11, a threaded connection 18 being here shown, so as to deliver the fertilizer to chamber 15. This connection of pipe 16 and shoulder 17 lies between and is encompassed by the blades 14 so that it is protected from disturbing ground contact. Pipe 16 at its upper end is provided with means, here shown as a screw thread 19, for connecting it with any suitable supply reservoir (not shown) from which fertilizer will be supplied to the pipe, the chamber, and the distributing apertures.

Constructed in accordance with this disclosure an implement is provided which will effectively distribute a fluid fertilizer to the walls of a furrow; which will prevent clogging of the distributing apertures, and what is of prime importance, will pack the earth in rear of the fertilizer distributing openings and seal the fertilizer against dissipation after it has been deposited. Not only is it essential to keep the fertilizer in the soil to secure maximum fertilizing effect on the plants, but also, as some fertilizers, such as anhydrous ammonia, are highly inflammable and danger of escape to the atmosphere is eliminated or minimized.

A specific embodiment of the invention is shown, but it will be understood that such variations from the particular embodiment disclosed as involve only mechanical skill and are comprehended by the appended claims defining the invention, are to be regarded as within the purview of the invention.

I claim:

1. A plowshare comprising a furrow opening point having a fluid fertilizer receiving-chamber and distributing openings in the side walls of the point communicating with the chamber, anti-clogging flanges projecting from the sides of said point in front of the openings, a feed pipe secured to the rear edge of the share delivering to the chamber, and sealing blades projecting from the sides of said point in rear of the openings to seal the fertilizer in the side walls of the furrow.

2. A plowshare comprising a furrow opening point having a fluid fertilizer receiving-chamber and distributing openings in the side walls of the point communicating with the chamber, anti-clogging flanges projecting from the sides of said point in front of the openings, a feed pipe secured to the rear edge of the share delivering to the chamber, and outwardly flared sealing blades projecting from the sides of the point in rear of the openings to seal the fertilizer in the side walls of the furrow.

3. A plowshare comprising a furrow opening point having a fluid fertilizer receiving-chamber lengthwise of the point and lateral distributing openings in the side walls of the point communicating with the chamber, anti-clogging flanges projecting from the sides of the point in front of the openings, a shoulder on said point in rear of the chamber, a feed pipe secured and conforming to the rear edge of the share lying within the cross-sectional area of the share connected to said shoulder and delivering to the chamber, and outwardly flaring blades on said point encompassing said shoulder and feed pipe to protect said pipe from contact with the furrow walls, and to seal the fertilizer in the side walls of the furrow.

4. A plowshare comprising a furrow opening point of substantial lateral width and a reduced portion rearwardly of and of less lateral width than the point, said reduced portion having a plurality of bores opening to the laterally facing surfaces of said reduced portion, a longitudinally disposed chamber communicating with said bores, and means on said point positioned rearwardly of the reduced portion thereof and projecting outwardly therefrom to laterally wipe fluid into the side walls of the furrow.

JAMES S. BELL.

REFERENCES CITED

The following references are of record in the file of this patent:

UNITED STATES PATENTS

| Number | Name | Date |
|---|---|---|
| 261,558 | Lambert | July 25, 1882 |
| 1,014,655 | Larose | Jan. 16, 1912 |
| 1,962,116 | Atwater | June 12, 1934 |
| 2,008,891 | Woods | July 23, 1935 |
| 2,357,760 | Peacock | Sept. 5, 1944 |
| 2,598,121 | Hannibal | May 27, 1952 |

FOREIGN PATENTS

| Number | Country | Date |
|---|---|---|
| 36,551 | France | Mar. 18, 1930 |
| | (Addition to No. 661,045) | |
| 144,504 | France | Aug. 12, 1881 |
| 283,035 | Great Britain | Jan. 5, 1928 |